United States Patent [19]
Akiba et al.

[11] Patent Number: 5,841,919
[45] Date of Patent: Nov. 24, 1998

[54] OPTICAL WAVELENGTH MULTIPLEXER/ DEMULTIPLEXER

[75] Inventors: Kenji Akiba; Morihiko Ikegaya, both of Ibaraki, Japan

[73] Assignee: Hitachi Cable, Ltd., Tokyo, Japan

[21] Appl. No.: 808,748

[22] Filed: Feb. 28, 1997

[30] Foreign Application Priority Data

Aug. 2, 1996 [JP] Japan .................................. 8-204948

[51] Int. Cl.$^6$ ...................................................... G02B 6/26
[52] U.S. Cl. .............................. 385/37; 385/14; 385/46; 385/43
[58] Field of Search .............................. 385/24, 37, 46, 385/43, 15, 14

[56] References Cited

U.S. PATENT DOCUMENTS

| | | | |
|---|---|---|---|
| 4,904,042 | 2/1990 | Dragone | 350/96.16 |
| 5,136,671 | 8/1992 | Dragone | 385/46 |
| 5,243,672 | 9/1993 | Dragone | 385/46 |
| 5,339,157 | 8/1994 | Glance et al. | 385/24 |
| 5,467,418 | 11/1995 | Dragone | 385/37 |
| 5,625,723 | 4/1997 | Dragone et al. | 385/37 |

FOREIGN PATENT DOCUMENTS

| | | |
|---|---|---|
| 4-39049 | 6/1992 | Japan . |
| 07333447A | 12/1995 | Japan . |
| 8-74155 | 3/1996 | Japan . |

*Primary Examiner*—John Ngo
*Attorney, Agent, or Firm*—McDermott, Will & Emery

[57] ABSTRACT

An optical wavelength multiplexer/demultiplexer has an input channel waveguide for receiving a wavelength division multiplexed signal, a first slab waveguide having an input boundary and a fan-shaped output boundary, an arrayed-waveguide grating comprising N channel waveguides, which provides a predetermined waveguide length difference from each other, a second slab waveguide having a fan-shaped input boundary and an output boundary, N output channel waveguides for each receiving a demultiplexed optical signals having a desired wavelength $\lambda 1, \lambda 2, \ldots$ or $\lambda n$. The channel waveguides of the arrayed-waveguide grating are arranged along the fan-shaped output boundary of the first slab waveguide such that an angle $\theta$ between the central axis of "i"th (i=1, 2, . . . N) channel waveguide and the symmetric axis of the fan-shaped output boundary of the first slab waveguide 4 satisfies the certain equations.

9 Claims, 9 Drawing Sheets

OPTICAL WAVELENGTH MULTIPLEXER/DEMULTIPLEXER

FIELD OF THE INVENTION

This invention relates to an optical wavelength multiplexer/demultiplexer utilizing an arrayed-waveguide grating having a wavelength dispersion function, and more particularly to, an optical wavelength multiplexer/demultiplexer which has flatter loss relative to wavelength characteristics in its passband.

BACKGROUND OF THE INVENTION

Optical communication systems for enhancing information capacity by transmitting a number of different wavelength optical signals over an optical fiber, such as a wavelength division multiplexed (WDM) system, have been studied. In the WDM system, an optical wavelength multiplexer/demultiplexer is considered to play a significant roll to multiplex or demultiplex different wavelength optical signals. Particularly, one of the most promising optical wavelength multiplexer/demultiplexers for such use is one which utilizes an arrayed-waveguide grating, which may increase the number of multiplexed signals with relatively narrow wavelength spacings. In order to reduce the variation of insertion losses due to the variation of wavelengths of light sources, Japanese Published Patent Application No.7-333447 has proposed an arrayed-waveguide grating that may flatten loss relative to wavelength characteristics in the vicinity of a center wavelength.

A conventional optical wavelength multiplexer/demultiplexer comprises an input channel waveguide for receiving a wavelength division multiplexed signal, a first slab waveguide having an input boundary and a fan-shaped output boundary, an arrayed-waveguide grating comprising N channel waveguides which provides a predetermined waveguide length difference from each other, a second slab waveguide having a fan-shaped input boundary and an output boundary, a plurality of output channel waveguides for each receiving a demultiplexed optical signal having a desired wavelength. The input channel waveguide is connected to the input boundary of the first slab waveguide, the fan-shaped output boundary of which is connected to the input end of the arrayed-waveguide grating. In the same way, the output end of the arrayed-waveguide grating is connected to the fan-shaped input boundary of the second slab waveguide, the output boundary of which is connected to the plurality of output channel waveguides. All these elements are incorporated in a substrate to form a single device.

In operation, the wavelength division multiplexed signal, which is coupled into the input channel waveguide, expands into the first slab waveguide by diffraction. Then, the expanded signal is distributed to the channel waveguides of the arrayed-waveguide grating, which are arranged in such a position that the central axis of each channel waveguide is uniformly separated by a certain spacing and is perpendicular to the wavefront of the expanding (fan-shaped) signal. In this case, distribution of a power of the signal to the arrayed-waveguide grating, i.e., distribution of electric field to each channel waveguide depends on an aperture width of each channel waveguide at the fan-shaped output boundary of the first slab waveguide. On the other hand as each channel waveguide of the arrayed-waveguide has a predetermined waveguide length difference by adding an extra waveguide length thereto, each signal, after traveling over each channel waveguide to the fan-shaped input boundary of the second slab waveguide, has a predetermined phase difference according to its waveguide length difference. Since the phase difference depends on the wavelength of the signal, each signal having a different wavelength is focused on a different position along the output boundary of the second slab waveguide due to a lens effect thereof As a result, selected signals having different wavelengths from each other are received by the plurality of output channel waveguides, respectively.

An ideal optical wavelength multiplexer/demultiplexer should have low and flat loss relative to wavelength characteristics in the vicinity of each center wavelength. For this purpose, two different distribution characteristics at the fan-shaped input boundary of the second slab waveguide may be considered One is electric field amplitude distribution along the input boundary, and another is phase difference distribution there Ideally, the former may show an amplitude distribution of repetitive maximum and minimum value, the latter a phase difference distribution of repetitive "0" and "$\pi$". From this point of view, the aperture width of each channel waveguide of the arrayed-waveguide grating at the fan-shaped output boundary of the first slab waveguide, and the extra waveguide length of each channel waveguide are designed.

In the conventional optical wavelength multiplexer/demultiplexer, however, there is a disadvantage in that its loss is still high in the vicinity of each center wavelength because of a relatively larger amount of leaked lights at the fan-shaped output boundary of the first slab waveguide. In addition to that, there is another disadvantage in that the leaked lights may affect both the electric field distribution and the phase difference distribution, which results in a deterioration of cross-talk characteristics. Therefore, it is still difficult to obtain flat loss relative to wavelength characteristics.

SUMMARY OF THE INVENTION

Accordingly, it is an object of the invention to provide an optical wavelength multiplexer/demultiplexer by which its loss in the vicinity of each center wavelength becomes lower and cross-talk characteristics are improved.

It is a further object of the invention to provide an optical wavelength multiplexer/demultiplexer by which flatter loss relative to wavelength characteristics are obtained.

According to the first feature of the invention, an optical wavelength multiplexer/demultiplexer incorporated in a substrate comprises:

at least one input channel waveguide for receiving a wavelength division multiplexed signal;

a first slab waveguide having an input boundary and a fan-shaped output boundary, the input channel waveguide being connected to the input boundary of the first slab waveguide;

an arrayed-waveguide grating comprising N channel waveguides which provides a predetermined waveguide length difference from each other, an input end of the arrayed-waveguide grating being connected to the fan-shaped output boundary;

a second slab waveguide having a fan-shaped input boundary and an output boundary an output end of the arrayed-waveguide grating being connected to the fan-shaped input boundary of the second slab waveguide; and a plurality of output channel waveguides connected to the output boundary of the second slab waveguide for each receiving an demultiplexed optical signal having a desired wavelength;

wherein input ends of the N channel waveguides of the arrayed-waveguide grating are arranged along the fan-shaped output boundary of the first slab waveguide such that an angle θ between the central axis of "i"th (i=1, 2, . . . N) channel waveguide and the symmetric axis of the fan-shaped output boundary of the first slab waveguide satisfies the equations in that;

$$\int_{\theta_i - \Delta\theta_i/2}^{\theta_i + \Delta\theta_i/2} Eg(\theta) d\theta = A \times E(i),$$

$$\theta_i - \Delta\theta_i/2 = \theta_{i-1} + \Delta\theta_{i-1}/2$$

where $Eg(\theta)$ is an electric field distribution at the fan-shaped output boundary of the first slab waveguide, $E(i)$ is a desired electric field amplitude to be coupled to the "i"th channel waveguide, $\Delta\theta_i$ is an angle made by the central axis perpendicular to a gap on the right side of the "i"th channel waveguide and that on the left side thereof, and A is a constant.

According to the second feature of the invention, an optical wavelength multiplexer/demultiplexer incorporated in a substrate, comprises:

at least one input channel waveguide for receiving a wavelength division multiplexed signal;

a first slab waveguide having an input boundary and a fan-shaped output boundary, the input channel waveguide being connected to the input boundary of the first slab waveguide;

an arrayed-waveguide grating comprising a plurality of channel waveguides which provides a predetermined waveguide length difference from each other, an input end of the arrayed-waveguide grating being connected to the fan-shaped output boundary;

a second slab waveguide having a fan-shaped input boundary and an output boundary, an output end of the arrayed-waveguide grating being connected to the fan-shaped input boundary of the second slab waveguide; and a plurality of output channel waveguides connected to the output boundary of the second slab waveguide for each receiving an demultiplexed optical signal having a desired wavelength;

wherein each of the plurality of channel waveguides of the arrayed-waveguide grating is provided with a tapered portion having a predetermined aperture width at the fan-shaped output boundary of the first slab waveguide for coupling a predetermined amplitude of electric field into each said channel waveguide, the plurality of channel waveguides of the arrayed-waveguide grating are nonuniformly arranged along the fan-shaped output boundary so that each of adjacent tapered portions of adjacent channel waveguides is separated by a gap which is smaller than a predetermined width.

According to the third feature of the invention, an optical wavelength multiplexer/demultiplexer incorporated in a substrate, comprises:

at least one input channel waveguide for receiving a wavelength division multiplexed signal;

a first slab waveguide having an input boundary and a fan-shaped output boundary, the input channel waveguide being connected to the input boundary of the first slab waveguide;

an arrayed-waveguide grating comprising a plurality of channel waveguides which provides a predetermined waveguide length difference from each other, an input end of the arrayed-waveguide grating being connected to the fan-shaped output boundary;

a second slab waveguide having a fan-shaped input boundary and an output boundary, an output end of the arrayed-waveguide grating being connected to the fan-shaped input boundary of the second slab waveguide; and a plurality of output channel waveguides connected to the output boundary of the second slab waveguide for each receiving an demultiplexed optical signal having a desired wavelength;

wherein each of the plurality of channel waveguides of the arrayed-waveguide grating is provided with a tapered portion having a predetermined aperture width at the fan-shaped output boundary of the first slab waveguide, the predetermined aperture width of each said channel waveguide varies in its value repetitively along the fan-shaped output boundary, the plurality of channel waveguides of the arrayed-waveguide grating are nonuniformly arranged such that angles made by the central axes of adjacent channel waveguides vary along the fan-shaped output boundary so that each gap made by adjacent tapered portions of the adjacent channel waveguides is smaller than a predetermined width.

BRIEF DESCRIPTION OF THE DRAWINGS

The invention will be explained in more detail in conjunction with the appended drawings, wherein.

DESCRIPTION OF THE PREFERRED EMBODIMENTS

Before explaining an optical wavelength multiplexer/demultiplexer in the preferred embodiment, the aforementioned conventional optical wavelength multiplexer/demultiplexer will be explained in FIGS. 1, 2 and 3.

Figure 1:
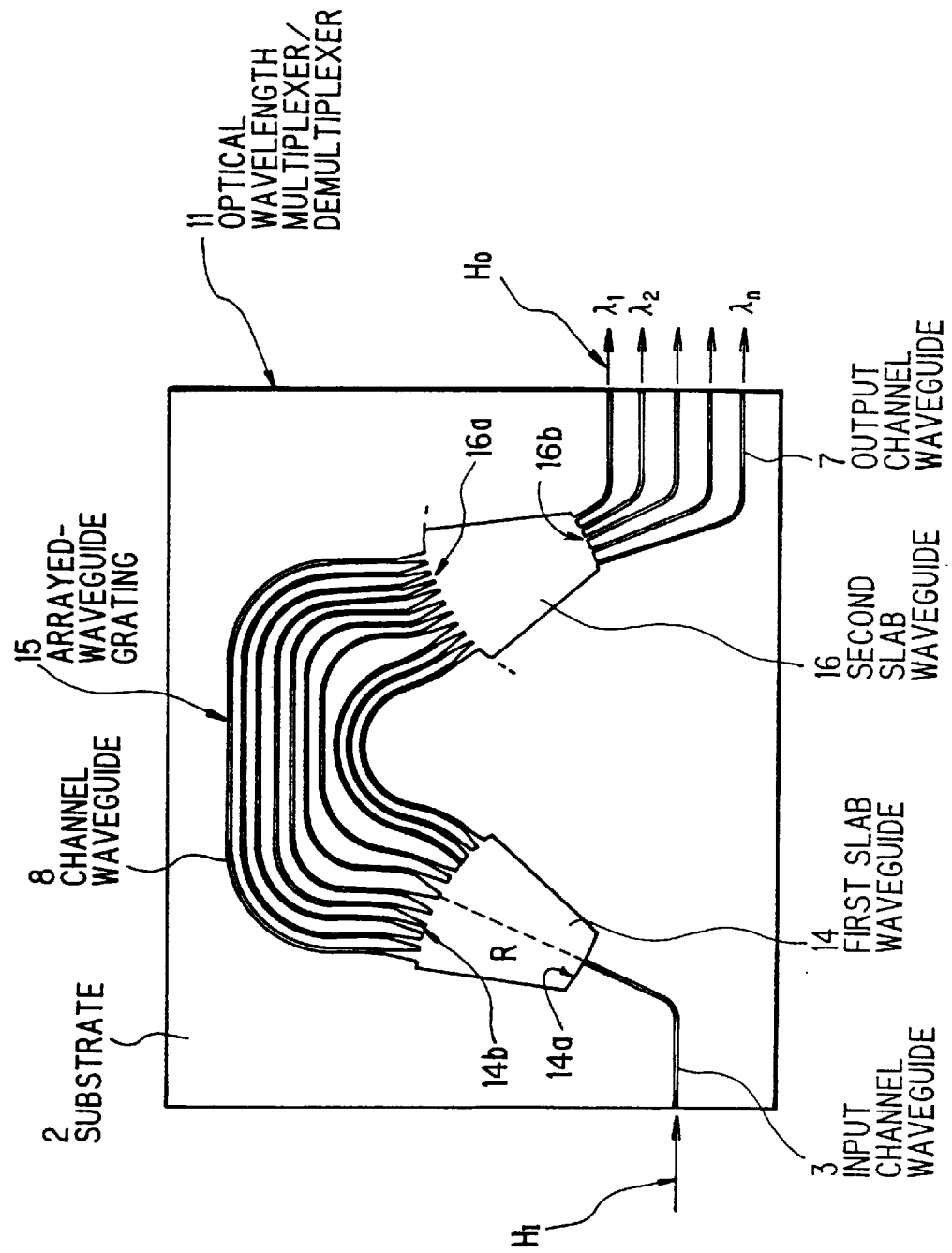
FIG. 1 is a plane view showing a conventional optical wavelength multiplexer/demultiplexer.

FIG. 1 shows the conventional optical wavelength multiplexer/demultiplexer. The optical wavelength multiplexer/demultiplexer 11 comprises an input channel waveguide 3 for receiving a wavelength division multiplexed signal $H_I$, a first slab waveguide 14 having an input boundary 14a and a fan-shaped output boundary 14b, an arrayed-waveguide grating 15 comprising N channel waveguides 8, which provides a predetermined waveguide length difference from each other, a second slab waveguide 16 having a fan-shaped input boundary 16a and an output boundary 16b, N output channel waveguides 7 for receiving a demultiplexed optical signal $H_O$ having a desired wavelength $\lambda 1, \lambda 2, \ldots$ or $\lambda n$. The input channel waveguide 3 is connected to the input boundary 14a of the first slab waveguide 14, the fan-shaped output boundary 14b of which is connected to the input end of the arrayed-waveguide grating 15. In the same way, the output end of the arrayed-waveguide grating 15 is connected to the fan-shaped input boundary 16a of the second slab waveguide 16, the output boundary 16b of which is connected to the N output channel waveguides 7. All these elements are incorporated in a substrate 2 to form a single optical wavelength multiplexer/demultiplexer 11.

Figure 2:
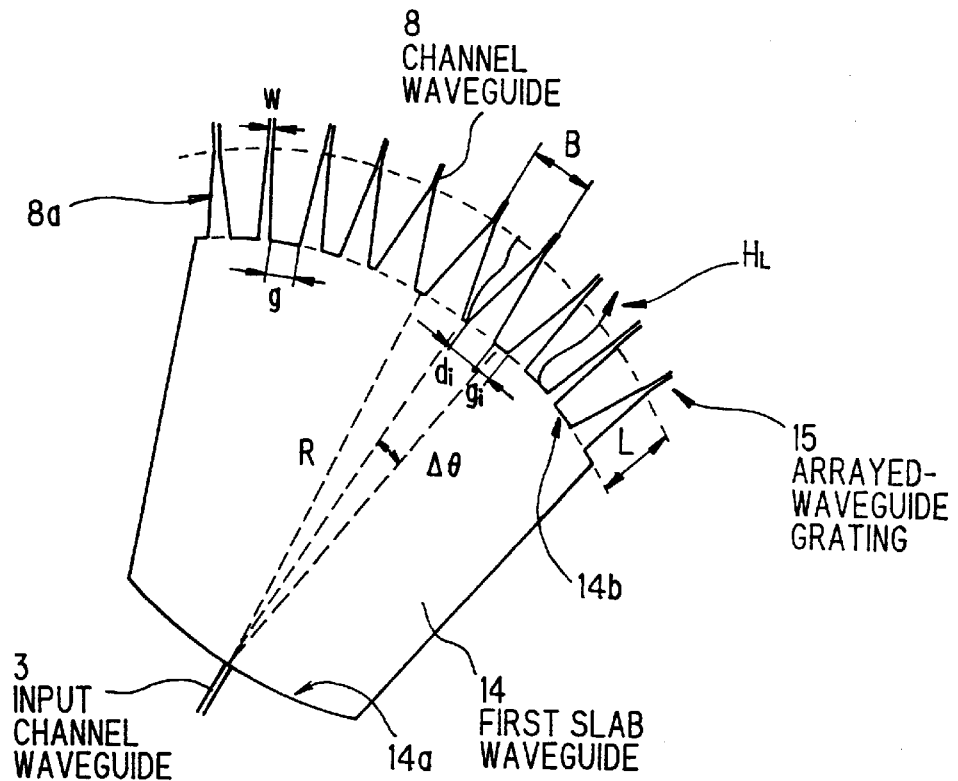
FIG. 2 is a partially plane view, on an enlarged scale, of a portion of a first slab waveguide in the conventional optical wavelength multiplexer/demultiplexer shown in FIG. 1.

FIG. 2 shows a portion of a first slab waveguide in the conventional optical wavelength multiplexer/demultiplexer, on an enlarged scale, wherein like parts are indicated by like reference numerals as used in FIG. 1. The channel waveguides 8 of the arrayed-waveguide grating 15 are arranged in such a position that the central axis of each channel waveguide is uniformly separated by a constant spacing B from one other and is perpendicular to the fan-shaped output boundary 14b of the first slab waveguide 14. The fan-shaped output boundary 14b has a radius of curvature R, the center of the curvature is positioned at the center of the input boundary 14a, i.e., the output end of the input channel waveguide 3 in FIG. 2, for example. Each of the channel waveguides 8 of the arrayed-waveguide grating 15 has a tapered portion 8a by which each of the channel waveguides 8 is connected to the fan-shaped output boundary 14b of the first slab waveguide 14, the length of which is L. The input channel waveguide 3, the N output channel waveguides 7, and the channel waveguides 8 of the arrayed-waveguide grating 15 have the same waveguide width W, while the tapered portions 8a of the channel waveguides 8 have the different aperture widths $d_i$ (i=1,2, ... N), which depend on the position of the channel waveguides 8 along the fan-shaped output boundary 14b. In addition to that, each pair of adjacent tapered portions 8 of the channel waveguides 8 make a predetermined width of gap. For example, the gap between the tapered portion of the "i"th channel waveguide and that of the "i−1"th channel waveguide is defined as $g_i$.

Figure 3:
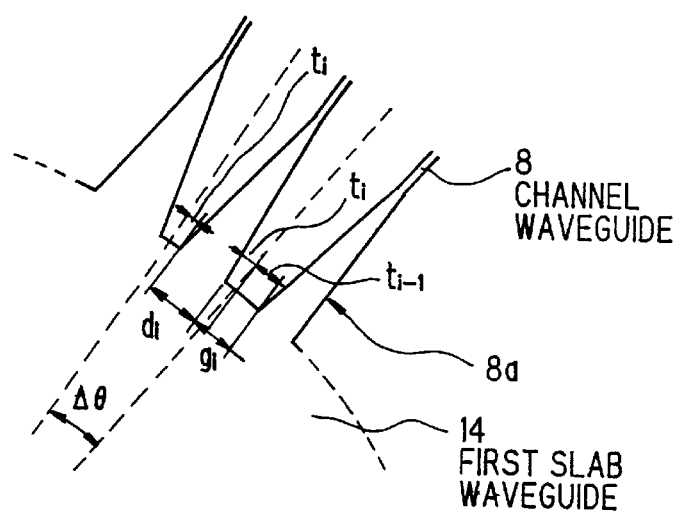
FIG. 3 is a partially plane view, on a more enlarged scale, showing the vicinity of an output boundary of the first slab waveguide and input ends of channel waveguides of arrayed-waveguide grating shown in FIG. 2.

FIG. 3 shows the vicinity of the fan-shaped output boundary 14b of the first slab waveguide 14 and input ends of channel waveguides 8 of the arrayed-waveguide grating 15 shown in FIG. 2. The aperture width $d_i$ of the tapered portion 8a is defined by the following equation.

$$d_i = R \times \Delta\theta - 2t_i, \quad (1)$$

$$t_i + t_{i-1} = g_i, \text{ and } g_i = B - (d_i + d_{i-1})/2, \quad (2)$$

where R is a radius of curvature of the fan-shaped output boundary of the first slab waveguide, $\Delta\theta$ is an angle made by the adjacent center axes each of which goes through the center of the adjacent pair of channel waveguides, $t_i$ is a gap between one of the adjacent center axes and the edge of the tapered portion 8a, and B is a constant spacing between the adjacent channel waveguides (i.e. $B = R \times \Delta\theta$).

On the other hand, the "i"th channel waveguide 8 of the arrayed-waveguide grating 15 has a channel waveguide length defined by the following equation.

$$L_i = \Delta L \times (i-1) + Q(i) + Lc \quad (3)$$

where $\Delta L$ is a length difference between adjacent channel waveguides which is necessary to produce wavelength dispersion of a wavelength-division multiplexed signal light traveling over the channel waveguide and couple a desired demultiplexed signal light into the output channel waveguides, Q(i) is an extra waveguide length to adjust the phase of the "i"th channel waveguide, Lc is an initial waveguide length of the first channel waveguide (i.e. i=1) of the arrayed-waveguide grating.

In operation, the wavelength division multiplexed signal $H_I$, which is coupled into the input channel waveguide 3, expands into the first slab waveguide 14 by diffraction. Then, the expanded signal is distributed to the channel waveguides 8 of the arrayed-waveguide grating 15, which are arranged in such a position as explained above. In this case, a distribution of the power of the signal to the arrayed-waveguide grating 15, i.e., a distribution of electric field to each channel waveguide 8 depends on the aperture width $d_i$ of each channel waveguide 8 at the fan-shaped output boundary 14b of the first slab waveguide 14. On the other hand, since each channel waveguide 8 of the arrayed-waveguide 15 has a predetermined waveguide length difference, each signal, after traveling over each channel waveguide 8 to the fan-shaped input boundary 16a of the second slab waveguide 16, has a predetermined phase difference according to its waveguide length difference. Since the phase difference depends on the wavelength of the input signal, each signal having a different wavelength is focused on a different position along the output boundary 16b of the second slab waveguide 16 due to a lens effect. As a result, selected output signals $H_O$ having different wavelengths $\lambda 1, \lambda 2, \ldots \lambda n$ are received by the output channel waveguides 7 respectively.

In the conventional optical wavelength multiplexer/demultiplexer, since the distributions of electric field amplitude distribution and phase difference distribution of the input signal $H_I$ at the fan-shaped input boundary 16b of the second slab waveguide 16 and the loss relative to wavelength characteristics obtained from the output channel waveguides 7 are related to with each other by Fourier transformation, these distributions may be determined by the desired loss relative to wavelength characteristics.

Figure 4:
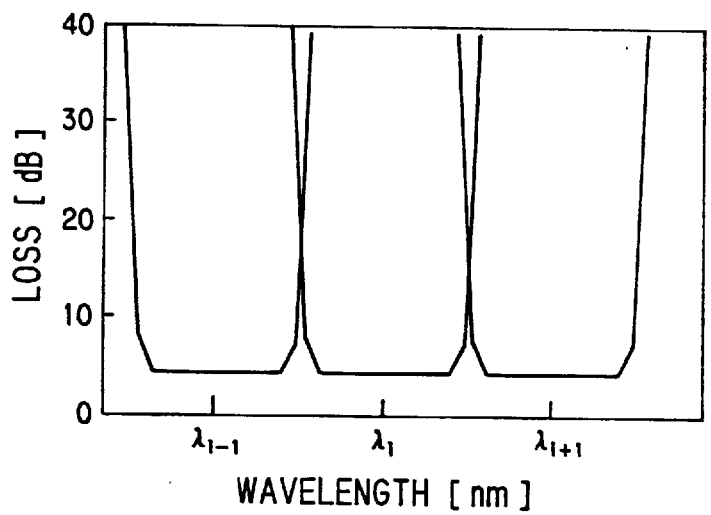
FIG. 4 is a graph showing an example of ideal loss relative to wavelength characteristics of an ideal optical wavelength multiplexer/demultiplexer.

FIG. 4 shows ail example of ideal loss relative to wavelength characteristics of an ideal optical wavelength multiplexer/demultiplexer. This has flat loss to wavelength characteristics in the vicinity of each center wavelength $(\lambda_{i-1}, \lambda_i, \lambda_{i+1})$.

Figure 5A:
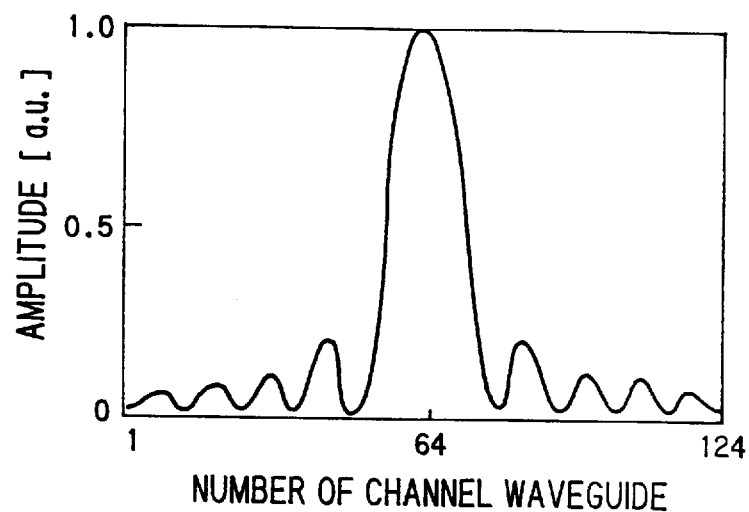
FIGS. 5A and 5B are graphs showing distributions of amplitude and phase difference of signals along an input boundary of second slab waveguide, respectively, which are calculated based on the ideal loss relative to wavelength characteristics shown in FIG. 4, FIGS. 6A and 6B are graphs showing a distribution of aperture widths of the channel waveguides of the arrayed-waveguide grating at an output boundary of first slab waveguide, and that of extra waveguide lengths of the channel waveguides in the conventional optical wavelength multiplexer/demultiplexer, both of which are relative to the number of the channel waveguide, respectively.
Figure 5B:
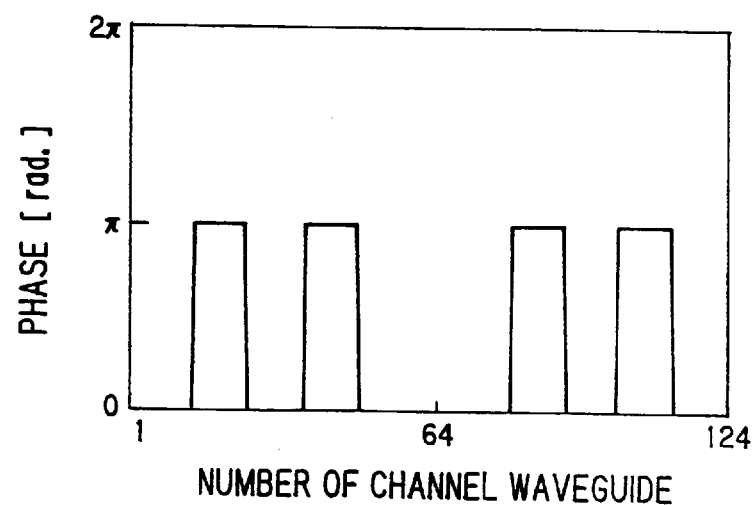

FIGS. 5A and 5B show examples of an electric field amplitude distribution and a phase difference distribution of the signal light at the vicinity of the input boundary 16a of the second slab waveguide 16, which are calculated by the ideal loss relative to wavelength characteristics, where the horizontal axis shows the number of the channel waveguides 8 of the arrayed-waveguides grating 15. In the example, the number of the channel waveguides B is 124. As shown in FIGS. 5A and 5B, the amplitude has a distribution of repetitive maximum and minimum value, while the phase has a distribution of repetitive "0" and "π". The former characteristics ought to be obtained by adjusting the aperture width $d_i$ of each channel waveguide 8 at the fan-shaped output boundary 14b of the first slab waveguide14, and the latter be obtained by adjusting the extra waveguide length Q(i) of each channel waveguide 8. That is to say it is necessary to adjust the aperture width $d_i$ and the extra waveguide length Q(i) of each channel waveguide 8 to obtain flat loss relative to wavelength characteristics in the vicinity of each center wavelength.

Figure 6A:
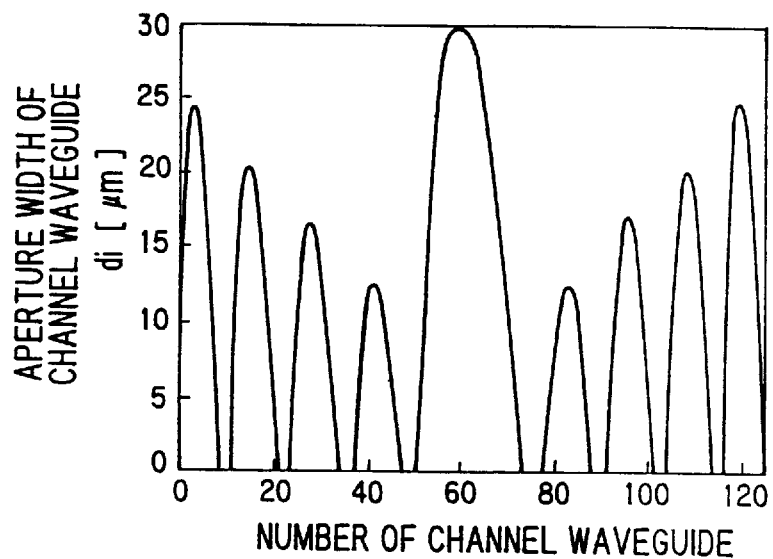
Figure 6B:
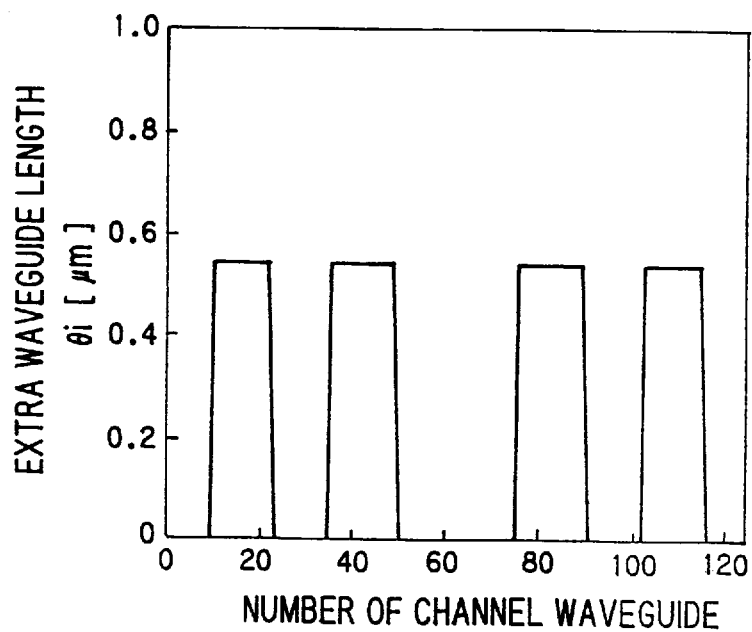

FIGS. 6A and 6B show examples of distributions of aperture width $d_i$ and the extra waveguide length Q(i) of the conventional optical wavelength multiplexer/demultiplexer, features of which are similar to the distributions of the electric amplitude and the phase difference shown in FIGS. 5A and 5B.

If the input signal light $H_I$ is ideally distributed into each channel waveguide 8 of the arrayed-waveguide grating 15, and the phase of the distributed signal after traveling over each channel waveguide 8, is ideally adjusted due to the extra waveguide length Q(i), the ideal distributions of the amplitude and the phase shown in FIGS. 5A and 5B may be obtained. As a result, the ideal loss relative to wavelength characteristics shown in FIG 4 may be realized. The actual loss relative to wavelength characteristics of the conventional optical wavelength multiplexer/demultiplexer, however, are quite different from the ideal characteristics.

Figure 7:
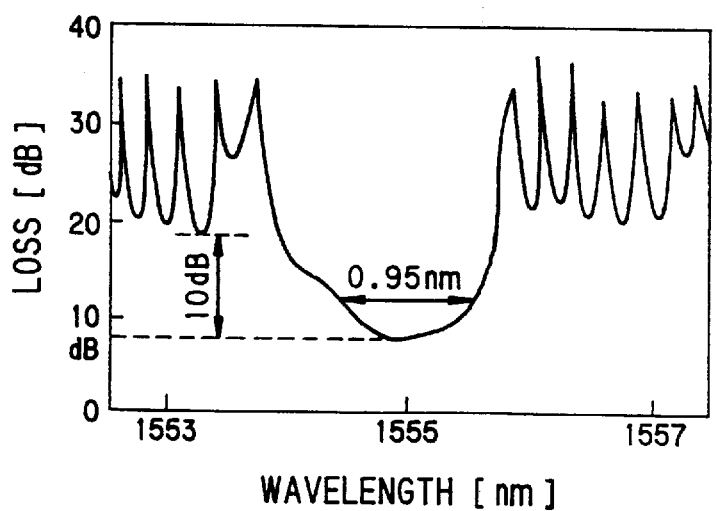
FIG. 7 is a graph showing an example of actual loss relative to wavelength characteristics of the conventional multiplexer/demultiplexer.

FIG 7 shows actual loss relative to wavelength characteristics measured in the conventional optical wavelength multiplexer/demultiplexer. In this graph, the minimum loss at a center wavelength of 1555 nm is 8 dB, the 3 dB band width is 0.95 nm, and the cross-talk is 10 dB. The reason why the actual characteristics in the conventional optical wavelength multiplexer/demultiplexer differ from ideal ones will be explained below.

First, in the conventional optical wavelength multiplexer/demultiplexer shown in FIGS. 1, 2, and 3, the channel waveguides 8 of the arrayed-waveguide grating 15 are uniformly arranged along the fan-shaped output boundary 14b of the first slab waveguide by separating each other by a constant spacing B, and the aperture width $d_i$ of the tapered portion Ba of each channel waveguide 8 is the only parameter to be adjusted to obtain an appropriate electric field amplitude distribution. Therefore, some channel waveguides having a relatively smaller aperture width $d_i$ make a larger gaps $g_i$ between them. As a result, a relatively larger amount of leaked lights $H_L$ from these gaps cause higher loss.

Second, parts of the leaked lights $H_L$ are recombined with other channel waveguides, which make it difficult to obtain the aimed electric field amplitude distribution in the channel waveguide. Moreover, the leaked lights $H_L$ cause the fluctuation of phase of the signal light $H_I$ traveling over each channel waveguide, which results in making cross-talk characteristics worse.

Next, an optical wavelength multiplexer/demultiplexer in the preferred embodiment will be explained in FIGS. 8 and 9, wherein like parts are indicated by like reference numerals as used in FIGS. 1, 2 and 3.

Figure 8:
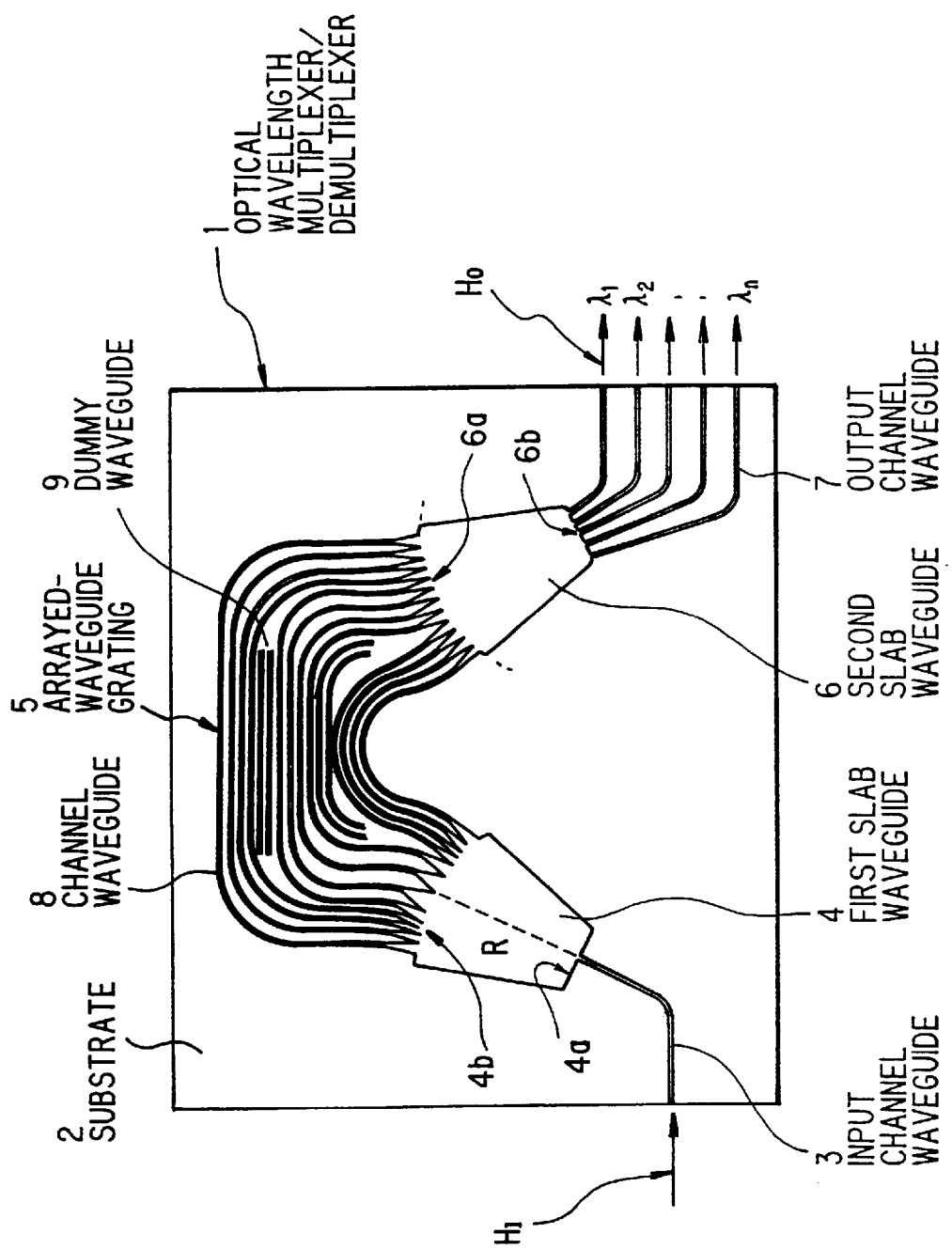
FIG. 8 is a plane view showing an optical wavelength multiplexer/demultiplexer in a preferred embodiment according to the invention.

FIG. 8 shows the preferred embodiment of the optical wavelength multiplexer/demultiplexer according to the invention. The optical wavelength multiplexer/demultiplexer, which is similar to the conventional one shown in FIG. 1, comprises an input channel waveguide 3 for receiving a wavelength division multiplexed signal $H_I$, a first slab waveguide 4 having an input boundary 4a and a fan-shaped output boundary 4b, an arrayed-waveguide grating 5 comprising N channel waveguides 8, which provides a predetermined waveguide length difference from each other, a second slab waveguide 6 having a fan-shaped input boundary 6a and an output boundary 6b, N output channel waveguides 7 for each receiving a demultiplexed optical signals $H_O$ having a desired wavelength λ1, λ2, . . . or λn. The input channel waveguide 3 is connected to the input boundary 4a of the first slab waveguide 4, the fan-shaped output boundary 4b of which is connected to the input end of the arrayed-waveguide grating 5. In the same way, the output end of the arrayed-waveguide grating 5 is connected to the fan-shaped input boundary 6a of the second slab waveguide 6, the output boundary 6b of which is connected to N output channel waveguides 7. Moreover, dummy waveguides 9 are provided between some pairs of adjacent channel waveguides 8 of the arrayed-waveguide grating 5 so that each of the waveguides 8 and 9 among the arrayed-waveguide grating 15 is separated from adjacent waveguides by a substantially equal spacing. All these elements are incorporated in a substrate 2 to form a single optical wavelength multiplexer/demultiplexer 1.

Figure 9:
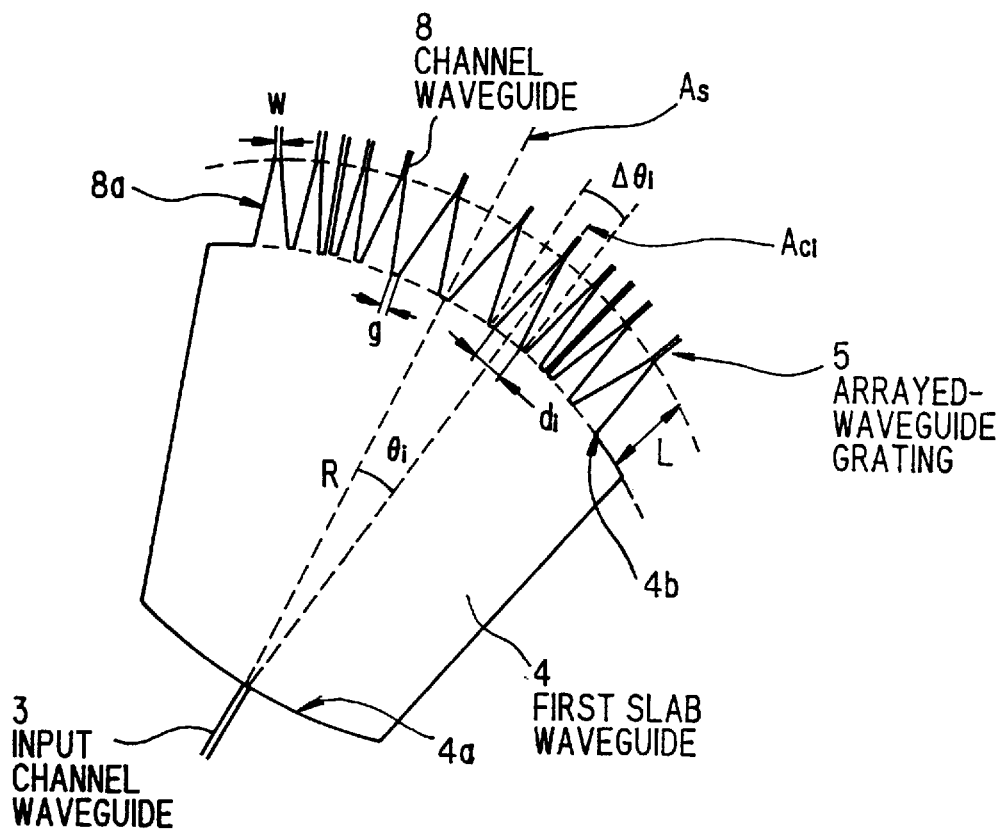
FIG. 9 is a partially plane view, on an enlarged scale, of a portion of a first slab waveguide in the preferred embodiment shown in FIG. 8.

FIG. 9 shows a portion of a first slab waveguide in the conventional optical wavelength multiplexer/demultiplexer, on an enlarged scale, wherein like parts are indicated by like reference numerals as used in FIG. 8. The channel waveguides 8 of the arrayed-waveguide grating 15 are arranged along the fan-shaped output boundary 4a of the first slab waveguide 4 such that an angle θ between the central axis $A_{Ci}$ of "i"th (i=1, 2, . . . N) channel waveguide and the symmetric axis $A_S$ of the fan-shaped output boundary 4 of the first slab waveguide 4 satisfies the equations in that;

$$\int_{\theta_i - \Delta\theta_i/2}^{\theta_i + \Delta\theta_i/2} Eg(\theta) d\theta = A \times E(i), \quad (4)$$

$$\theta_i - \Delta\theta_i/2 = \theta_{i-1} + \Delta\theta_{i-1}/2$$

where Eg(θ) is an electric field distribution at the fan-shaped output boundary of the first slab waveguide, E(i) is a desired electric field amplitude to be coupled to the "i"th channel waveguide $\Delta\theta_i$ and is an angle made by the central axis perpendicular to a gap on the right side of the "i"th channel waveguide and that on the left side thereof, and A is a constant. In this case, the central axis of each channel waveguide 8 of the arrayed-waveguide grating 5 is perpendicular to the fan-shaped output boundary 4b of the first slab waveguide 4.

The fan-shaped output boundary 4b has a radius of curvature R, the center of the curvature is positioned at the center of the input boundary 4a, i.e., the output a end of the input channel waveguide 3, for example. Each of the channel waveguides 8 of the arrayed-waveguide grating 15 has a tapered portion 8a by which each of the channel waveguides 8 is connected to the fan-shaped output boundary 4b of the first slab waveguide 4, the length of which is L. The input channel waveguide 31 the output channel waveguides 7 and the channel waveguides 8 of the arrayed-waveguide grating 5 have the same waveguide width W, while the tapered portions 8a of the channel waveguides 8 have the aperture widths $d_i$ (i =1,2, ... N), which are defined by the following equation.

$$d_i = R \times \Delta\theta_i - g, \tag{6}$$

where R is a radius of curvature of the fan-shaped output boundary of the first slab waveguide, g is a gap between adjacent taper portions of the channel waveguides at the output boundary.

In addition to that, the "i"th channel waveguide 8 of the arrayed-waveguide grating 5 has a channel waveguide length defined by the aforementioned equation (3), which is $$L_i = \Delta L \times (i-1) + Q(i) + Lc \tag{3}$$

where $\Delta L$ is a length difference between adjacent channel waveguides, which is defined by the following equation $$\Delta L = m \times \lambda / n_e \tag{7}$$

where m is a diffraction degree, $n_e$ is an equivalent refractive index of the channel waveguide.

On the other hand, each output end of the channel waveguides 8 of the arrayed-waveguide grating 5, which are connected to the fan-shaped input boundary 6a of the second slab waveguide 6, also has a tapered portion, but the aperture widths are the same. Moreover, the output ends of the channel waveguides 8 are uniformly arranged along the fan-shaped input boundary 6a by the same angle spacing.

In the embodiment, the substrate 2 may include, but is not limited to, a glass substrate, a semiconductor substrate, etc.. Preferably, the channel waveguides 3, 7, and 8, the dummy waveguides 9, and the first and second slab waveguides 4 and 6 may be covered by a cladding layer (not shown) and a buffer layer (not shown), which are formed on the substrate 2. These elements may be made of optically transparent material, such as, but not limited to, glass, semiconductor, etc..

In operation, the wavelength division multiplexed signal $H_I$, which is coupled into the input channel waveguide 3, expands into the first slab waveguide 4 by diffraction. Then, the expanded signal is distributed to the channel waveguides 8 of the arrayed-waveguide grating 5, which are arranged in such a position as defined by the equations (4) and (5).

In this case, as described before, distribution of electric field to be couples into each channel waveguide 8 depends on an aperture width $d_i$ of each channel waveguide 8 defined by the equation (6). According to the equation (4) and (5), the electric field amplitude coupled into each channel waveguide of the arrayed-waveguide grating 5 (the left side of the equation (4)) is designed to be proportional to a desired electric field amplitude (the right side of the equation (4)). As a result, an ideal distribution of the input signal $H_I$ at the fan-shaped output boundary 6a of the second slab waveguide 6, as shown in FIG. 5A, may be realized. In the equation (4), the constant A is preferably 0.9~1.0 so as to avoid higher insertion loss.

On the other hand, since each channel waveguide 8 of the arrayed-waveguide 5 has a predetermined waveguide length defined by the equations (3) and (7), after the distributed input signal light HI travels over each channel waveguide 8, an ideal phase difference distribution at the fan-shaped output boundary 6a of the second slab waveguide 6, as shown in FIG. 5B, may be realized.

In the second slab waveguide 6, since the phase difference depends on the wavelength of the signal, each signal having a different wavelength is focused on a different position along the output boundary 6b of the second slab waveguide 6 due to a lens effect thereof. As a result, selected output signals $H_O$ having different wavelengths λ1, λ2, . . . λn are received by the output channel waveguides 7, respectively.

In the preferred embodiment, the electric field amplitude distribution and the phase difference distribution of the input signal $H_I$ are desirably controlled. Eventually, the ideal loss relative to wavelength characteristics having a flat and low loss in the vicinity of each center wavelength, as shown in FIG. 4 may be obtained.

Figure 10:
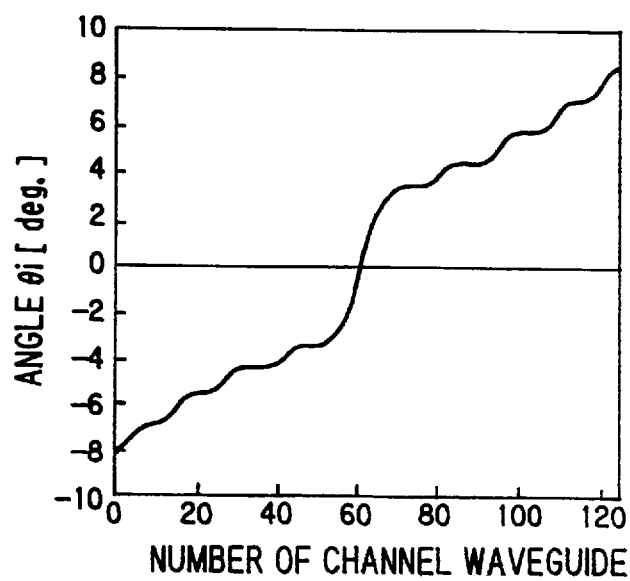
FIG. 10 is a graph showing an example of an angle distribution relative to the number of the channel waveguide of the arrayed-waveguide grating, by which the center axes of the channel waveguides are to be arranged along the output boundary of the first slab waveguide in the preferred embodiment.

FIG. 10 shows an example of a calculated distribution of the angle $\theta_i$ relative to the number of the channel waveguide 8 of the arrayed-waveguide grating 5, by which the center axes of the channel waveguides 8 are to be arranged along the output boundary of the first slab waveguide in the embodiment.

Figure 11A:
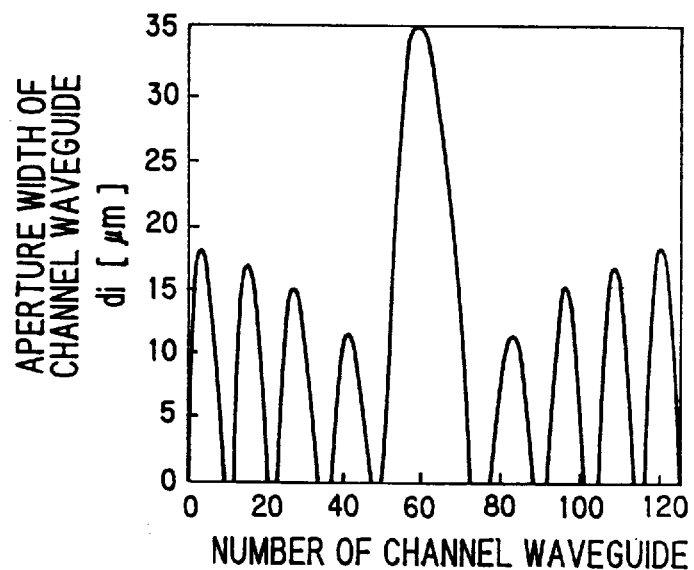
FIGS. 11A and 11B are graphs similar to FIGS. 6A and 6B, but showing a distribution of the aperture widths of the channel waveguides of the arrayed-waveguide grating at an output boundary of first slab waveguide and that of extra waveguide lengths of the channel waveguides in the preferred embodiment, respectively.
Figure 11B:
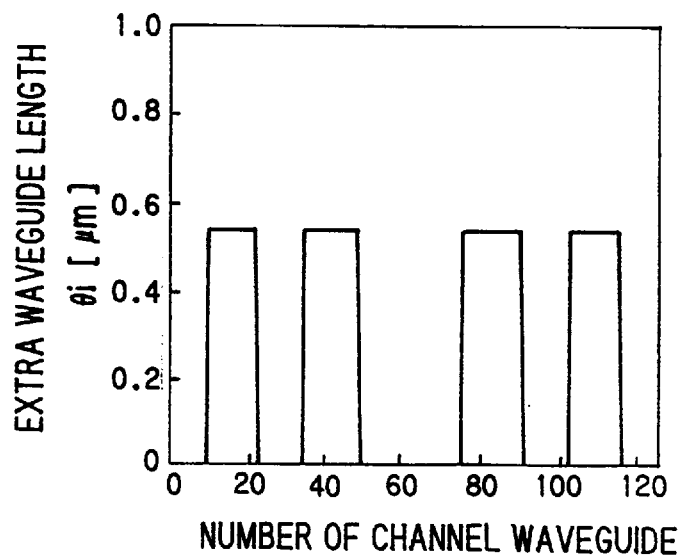

FIGS. 11A and 11B show examples of a calculated distribution of the aperture widths $d_i$ of the channel waveguides 8 of the arrayed-waveguide grating 5 at the fan-shaped output boundary 6a of first slab waveguide 6, and that of extra waveguide lengths Q(i) of the channel waveguides 8 in the preferred embodiment, respectively.

In FIGS. 10, 11A and 11B, R=5000 μm, A=1.01, N=124, W=6 μm, g=4 μm (g is preferably 2–6 μm, which is suitable for reducing the amount of leaked lights and sufficiently molding the channel waveguides by cladding layer (not shown)) are chosen.

As shown in FIG. 10, the angle $\theta_i$ distribution is repetitively changed relatively to the number of the channel waveguide 8 in a nonuniform fashion. On the other hand the aperture width $d_i$ distribution has a distribution of repetitive maximum and minimum value, as shown in FIG. 11A. The distribution of the extra waveguide length Q(i), as shown in FIG. 11B has a distribution of repetitive increase and decrease, which corresponds to the phase difference distribution shown in FIG. 5B.

In the preferred embodiment, although the width W of the channel waveguide 8 of the arrayed-waveguide grating 5 is decided to be 6 μm, the result shown in FIG. 11A may require some channel waveguides whose aperture widths are so small that adjacent channel waveguides may overlap with each other. To solve this problem practically, channel waveguides having a aperture width of less than 4 μm are to be omitted.

Referring to FIG. 8 again, the dummy waveguides 9 are provided between some pairs of adjacent channel waveguides 8 having a relatively wider spacing so that each of the channel waveguides 8 and the dummy waveguides 9 among the arrayed-waveguide grating 15, including channel waveguides 8 having a relatively narrower spacing, is separated from adjacent waveguides by a substantially equal spacing. The reason will be explained below.

In the preferred embodiment, the first slab waveguide 4 and the second slab waveguide 6 are connected by the channel waveguides 8 of the arrayed-waveguide grating 5, whose lengths satisfy the equation (3). On the other hand, the input ends of the channel waveguides 8 are nonuniformly arranged along the fan-shaped output boundary 4b of the first slab waveguide 4 in accordance with the equations (4) and (5). Eventually, the spacing between adjacent channel waveguides 8 varies over the arrayed-waveguide grating 5. In general, all the waveguides, including the input channel waveguide 3, the first slab waveguide 4, the channel waveguides 8 of the arrayed-waveguide grating 5, the second slab waveguide 6 and the output channel waveguides 7, are made by using a known etching technique. If the spacings between the adjacent channel waveguides differ from each other, etching speeds at which the channel waveguides are formed also differ. Eventually, it may cause a slight difference of waveguide width among these channel waveguides. As a result, desired loss relative to wavelength characteristics are not obtained, because the phase of the signal light $H_I$ traveling over the channel waveguide 8 may shift from the desired phase distribution. According to the preferred embodiment, each channel waveguide 9 is uniformly etched to have a substantially equal waveguide width W due to the appropriate arrangement of the dummy waveguides 9.

Next, a specific example of the optical wavelength multiplexer/demultiplexer according to the invention will be explained below.

In order to manufacture the specific example of the optical wavelength multiplexer/demultiplexer, a $SiO_2$ glass waveguide layer (core layer) containing a $TiO_2$ dopant is deposited on a silica substrate by an electron beam vapor deposition method. Then the waveguide layer is etched by using a photoresist pattern to form channel waveguides and slab waveguides on the substrate. After that, a $SiO_2$ cladding layer is deposited on these waveguides and the substrate by a flame deposition method, then sintered by an electric furnace to form a transparent glass layer The resulting optical wavelength multiplexer/demultiplexer is designed to have 8 output channel waveguides, each of which has a center wavelength spacing of 1.6 nm. The parameters of the optical wavelength multiplexer/demultiplexer are that the diffraction degree m=63, the equivalent refractive index $n_e$=1.4504, and $\Delta L$=67.6 $\mu$m. Furthermore, $\theta_i$, di and $Q_i$ are the same determined by the abovementioned preferred embodiment, which are shown in FIGS. 10, 11A and 11B.

Figure 12:
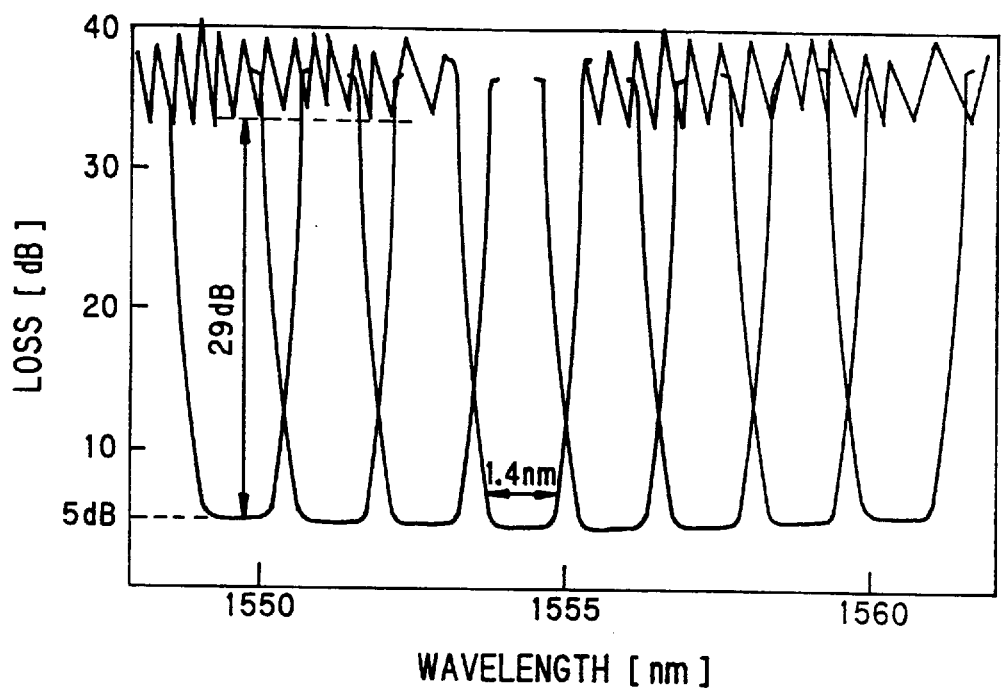
FIG. 12 is a graph showing an example of actual loss relative to wavelength characteristics in the preferred embodiment according to the invention.

FIG. 12 shows loss relative to wavelength characteristics of the specific example of the optical wavelength multiplexer/demultiplexer. This indicates that the loss at each center wavelength becomes as low as 5 dB, which is 3 dB lower than the conventional one. And also flatter loss relative to wavelength characteristics in the vicinity of each center wavelength are obtained. The 3 dB band width is 1.4 nm, which is approximately 1.5 times as wide as the conventional one. Moreover, the cross-talk is 29 dB, which is 19 dB higher than the conventional one.

As well explained above, the invention provides advantages set out below.

(1) electric field distribution of the signal light in the arrayed-waveguide grating is controlled. Then loss relative to wavelength characteristics having a lower loss, a less cross-talk, and flatter loss to wavelength characteristics in the vicinity of center wavelengths are realized.

(2) 3 dB band width is expanded and loss variation due to wavelength variation is reduced. As a result, an optical communication system utilizing the optical wavelength multiplexer/demultiplexer is more tolerate to the variation of a light source wavelength.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical wavelength multiplexer/demultiplexer incorporated in a substrate, comprising:

at least one input channel waveguide for receiving a wavelength division multiplexed signal;

a first slab waveguide having an input boundary and a fan-shaped output boundary, said input channel waveguide being connected to said input boundary of said first slab waveguide;

an arrayed-waveguide grating comprising N channel waveguides which provides a predetermined waveguide length difference from each other, an input end of said arrayed-waveguide grating being connected to said fan-shaped output boundary;

a second slab waveguide having a fan-shaped input boundary and an output boundary, an output end of said arrayed-waveguide grating being connected to said fan-shaped input boundary of said second slab waveguide; and a plurality of output channel waveguides connected to said output boundary of said second slab waveguide for each receiving an demultiplexed optical signal having a desired wavelength;

wherein input ends of said N channel waveguides of said arrayed-waveguide grating are arranged along said fan-shaped output boundary of said first slab waveguide such that an angle 0 between the central axis of "i"th (i=1, 2, . . . N) channel waveguide and the symmetric axis of said fan-shaped output boundary of said first slab waveguide satisfies the equations in that;

$$\int_{\theta_i-\Delta\theta_i/2}^{\theta_i+\Delta0_i/2} Eg(\theta)d\theta = A \times E(i),$$

$$\theta_i - \Delta\theta_i/2 = \theta_{i-1} + \Delta\theta_{i-1}/2$$

where $Eg(\theta)$ is an electric field distribution at the fan-shaped output boundary of said first slab waveguide, E(i) is a desired electric field amplitude to be coupled to said "i"th channel waveguide, $\Delta\theta_i$ is an angle made by the central axis perpendicular to a gap on the right side of said "i"th channel waveguide and that on the left side thereof, and A is a constant.

2. An optical wavelength multiplexer/demultiplexer, according to claim 1, wherein:

at least one predetermined length of dummy waveguide is provided between at least one pair of adjacent channel waveguides of said arrayed-waveguide grating so that each of waveguides among said arrayed-waveguide grating is separated from adjacent waveguides by a substantially equal spacing.

3. An optical wavelength multiplexer/demultiplexer, according to claim 1, wherein:

each said channel waveguide of said arrayed-waveguide grating is provided with a tapered portion having a predetermined aperture width to be connected to said fan-shaped output boundary of said first slab waveguide, said predetermined aperture width of said "i"th channel waveguide satisfies the equation in that, $$d_i = R \times \Delta\theta_i - g,$$

where R is a radius of curvature of said fan-shaped output boundary of said first slab waveguide, g is a gap between adjacent taper portions of said channel waveguides at said output boundary.

4. An optical wavelength multiplexer/demultiplexer, according to claim 1, wherein:

each said channel waveguide of said arrayed-waveguide grating is provided with a tapered portion having a predetermined aperture width to be connected to said fan-shaped output boundary of said first slab waveguide, said predetermined aperture width of said "i"th channel waveguide satisfies the equation in that, $$d_i = R \times \Delta\theta_i - (g_{i-1} + g_i)/2,$$

where R is a radius of curvature of said fan-shaped output boundary of said first slab waveguide, $g_{i-1}$ and $g_i$ are gaps on the left side and the right side of said "i"th channel waveguide at said output boundary, respectively.

5. An optical wavelength multiplexer/demultiplexer, according to claim 1, wherein:

the length of said "i"th channel waveguide of said arrayed-waveguide grating satisfies the equation in that;

$$L_i = \Delta L \times (i-1) + Q(i) + Lc,$$

where $\Delta L$ is a length difference between adjacent channel waveguides which is necessary to produce wavelength dispersion of a wavelength-division multiplexed signal light propagating into the channel waveguide and couple the desired demultiplexed signal light into said plurality of output channel waveguides, Q(i) is an extra waveguide length to adjust the phase of said "i"th channel waveguide, Lc is an initial waveguide length of the first channel waveguide (i.e. i=1) of the arrayed-waveguide grating.

6. An optical wavelength multiplexer/demultiplexer according to claim 5, wherein:

said length difference between adjacent channel waveguides satisfies the equation in that;

$$\Delta L = m \times \lambda / n_e,$$

where m is a diffraction degree, $n_e$ is an equivalent refractive index of the channel waveguides, $\lambda$ is a wavelength of a light signal.

7. An optical wavelength multiplexer/demultiplexer incorporated in a substrates comprising:

at least one input channel waveguide for receiving a wavelength division multiplexed signal;

a first slab waveguide having an input boundary and a fan-shaped output boundary, said input channel waveguide being connected to said input boundary of said first slab waveguide;

an arrayed-waveguide grating comprising a plurality of channel waveguides which provides a predetermined waveguide length difference from each other, an input end of said arrayed-waveguide grating being connected to said fan-shaped output boundary;

a second slab waveguide having a fan-shaped input boundary and an output boundary, an output end of said arrayed-waveguide grating being connected to said fan-shaped input boundary of said second slab waveguide; and a plurality of output channel waveguides connected to said output boundary of said second slab waveguide for each receiving an demultiplexed optical signal having a desired wavelength;

wherein each of said plurality of channel waveguides of said arrayed-waveguide grating is provided with a tapered portion having a predetermined aperture width at said fan-shaped output boundary of said first slab waveguide for coupling a predetermined amplitude of electric field into each said channel waveguide, said plurality of channel waveguides of said arrayed-waveguide grating are nonuniformly arranged along said fan-shaped output boundary so that each of adjacent tapered portions of adjacent channel waveguides is separated by a gap which is smaller than a predetermined width.

8. An optical wavelength multiplexer/demultiplexer, according to claim 7, wherein:

said gap is 2–6 $\mu$m wide.

9. An optical wavelength multiplexer/demultiplexer incorporated in a substrate, comprising:

at least one input channel waveguide for receiving a wavelength division multiplexed signal;

a first slab waveguide having an input boundary and a fan-shaped output boundary, said input channel waveguide being connected to said input boundary of said first slab waveguide;

an arrayed-waveguide grating comprising a plurality of channel waveguides which provides a predetermined waveguide length difference from each other, an input end of said arrayed-waveguide grating being connected to said fan-shaped output boundary;

a second slab waveguide having a fan-shaped input boundary and an output boundary, an output end of said arrayed-waveguide grating being connected to said fan-shaped input boundary of said second slab waveguide; and a plurality of output channel waveguides connected to said output boundary of said second slab waveguide for each receiving an demultiplexed optical signal having a desired wavelength;

wherein each of said plurality of channel waveguides of said arrayed-waveguide grating is provided with a tapered portion having a predetermined aperture width at said fan-shaped output boundary of said first slab waveguide, said predetermined aperture width of each said channel waveguide varies in its value repetitiely along said fan-shaped output boundary, said plurality of channel waveguides of said arrayed-waveguide grating are nonuniformly arranged such that angles made by the central axes of adjacent channel waveguides vary along said fan-shaped output boundary so that each gap made by adjacent tapered portions of said adjacent channel waveguides is smaller than a predetermined width; and said gap is 2–6 $\mu$m wide.

* * * * *